US012722485B2

(12) United States Patent
Takahashi et al.

(10) Patent No.: US 12,722,485 B2
(45) Date of Patent: Sep. 1, 2026

(54) VEHICLE DISPLAY DEVICE

(71) Applicant: Yazaki Corporation, Tokyo (JP)

(72) Inventors: Nobuyuki Takahashi, Shizuoka (JP); Jun Shihaku, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 19/072,392

(22) Filed: Mar. 6, 2025

(65) Prior Publication Data

US 2025/0196639 A1 Jun. 19, 2025

Related U.S. Application Data

(63) Continuation of application No. PCT/JP2023/045860, filed on Dec. 21, 2023.

(30) Foreign Application Priority Data

Jan. 25, 2023 (JP) ................................ 2023-009109

(51) Int. Cl.
*B60K 35/235* (2024.01)
*B60K 35/234* (2024.01)
*G02B 27/00* (2006.01)
*G02B 27/01* (2006.01)

(52) U.S. Cl.
CPC .......... *B60K 35/235* (2024.01); *B60K 35/234* (2024.01); *G02B 27/0093* (2013.01); *G02B 27/0101* (2013.01)

(58) Field of Classification Search
CPC .................................................. G02B 27/0101
See application file for complete search history.

(56) References Cited

U.S. PATENT DOCUMENTS

2011/0279487 A1* 11/2011 Imamura ................ G09G 3/342 345/102
2013/0063754 A1* 3/2013 Saisho ............... G02B 27/0101 358/1.13
2013/0242404 A1* 9/2013 Kobayashi ......... G02B 27/0101 359/630
2015/0198802 A1* 7/2015 Ando .................. G02B 26/101 359/200.8
2018/0067311 A1* 3/2018 Yokota .............. G02F 1/136209
2019/0162960 A1 5/2019 Harada et al.

FOREIGN PATENT DOCUMENTS

JP 2019-101056 A 6/2019

* cited by examiner

*Primary Examiner* — Nan-Ying Yang
(74) *Attorney, Agent, or Firm* — Sughrue Mion, PLLC

(57) ABSTRACT

A vehicle display device includes a display device, a reflective member that causes the reflected light to be projected onto a projection target portion, and a control unit that controls the display light. The display device includes a backlight unit and a light-transmitting plate-shaped display unit that causes the irradiation light incident from the irradiation surface to the illumination target surface to be transmitted and emitted from an emission surface as display light. The display unit is tilted relative to the irradiation surface such that, between the irradiation surface and the reflective member, the distance between the second edges defining the lower edges of a virtual image is greater than the distance between the first edges defining the upper edges of the virtual image, and the control unit makes illuminance of the irradiation light higher at the second edge than at the first edge.

6 Claims, 6 Drawing Sheets

VEHICLE DISPLAY DEVICE

CROSS-REFERENCE TO RELATED APPLICATION(S)

This application is a continuation application of International Application No. PCT/JP2023/045860 filed on Dec. 21, 2023 which claims the benefit of priority from Japanese Patent Application No. 2023-009109 filed on Jan. 25, 2023 and designating the U.S., the entire contents of which are incorporated herein by reference.

BACKGROUND OF THE INVENTION

1. Field of the Invention

The present invention relates to a vehicle display device.

2. Description of the Related Art

Conventionally, a vehicle is equipped with a vehicle display device that displays information as a virtual image to an occupant within the vehicle interior. The vehicle display device is commonly referred to as a head-up display, and includes a display device that emits display information to be projected onto a projection target portion as display light and a reflective member that reflects the display light emitted from the display device and projects the display light onto the projection target portion. The vehicle display device allows an occupant to visually perceive display information corresponding to the display light being projected onto the projection target portion as a virtual image. This type of vehicle display device is disclosed, for example, in JP 2019-101 056 A. The vehicle display device disclosed in JP 2019-101 056 A tilts an emission surface of a light-transmitting display unit to prevent any external light, reflected by a reflective member toward the emission surface, from being directed back to the reflective member, thereby avoiding glare from the external light.

By the way, a light-transmitting display unit transmits light emitted from a backlight positioned in the rear and emits the light as display light toward the reflective member from its emission surface. Conventional vehicle display device causes the display unit to be tilted relative to the optical axis of the light directed from the backlight toward the reflective member, and with such a display unit, the luminance at locations far from the backlight decreases, resulting in unevenness in luminance.

SUMMARY OF THE INVENTION

Thus, the present invention is intended to provide a vehicle display device with reduced unevenness in luminance.

In order to achieve the above mentioned object, a vehicle display device according to one aspect of the present invention includes a housing; a display device configured to emit display information as display light, visually perceived by an occupant within a vehicle interior as a virtual image, within the housing; at least one reflective member configured to reflect the display light emitted from the display device within the housing and cause the display light to be projected onto a projection target portion within the vehicle interior through an opening of the housing; and a control unit configured to control the display light depending on an eye point of the occupant or an eye box that is a range of the eye points that enables the visual perception of the virtual image; wherein the display device includes a backlight unit configured to diffuse and distribute light of a light source from an irradiation surface and includes a light-transmitting plate-shaped display unit configured to cause irradiation light incident from the irradiation surface to an irradiation target surface to be transmitted and emitted from an emission surface as the display light, the display unit is tilted relative to the irradiation surface such that, between the irradiation surface and the reflective member arranged in an optical axis direction of the backlight unit with respect to the irradiation surface, a distance between first edges defining lower edges of the virtual image in a vertical direction on the irradiation surface and the irradiation target surface is greater than a distance between second edges defining upper edges of the virtual image in the vertical direction on the irradiation surface and the irradiation target surface, and the control unit controls the backlight unit to make illuminance of the irradiation light to be incident from the irradiation surface to the irradiation target surface higher at the first edge than at the second edge, reducing unevenness in luminance of the display light to be emitted from the emission surface of the display unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes in detail an embodiment of a vehicle display device according to the present invention with reference to the drawings. Moreover, the description is not intended to limit the present invention to the embodiments described herein.

Embodiments

One embodiment of the vehicle display device according to the present invention will be described with reference to FIGS. 1 to 6.

Figure 1:
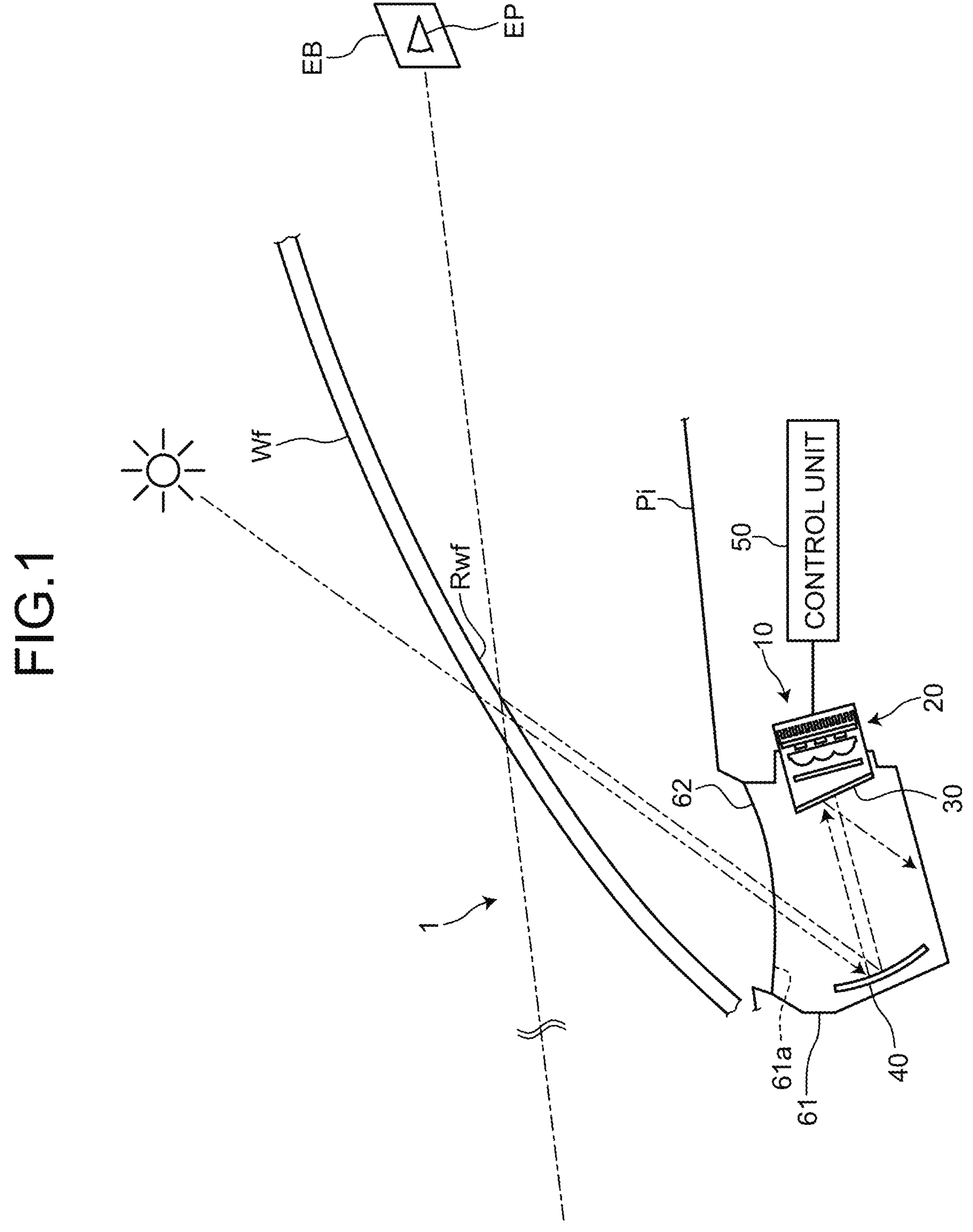
FIG. 1 is a schematic diagram illustrating a vehicle display device of an embodiment.

FIG. 1 illustrates a vehicle display device according to the present embodiment indicated by the reference numeral 1. The vehicle display device 1 is commonly referred to as a head-up display device that displays information, in the form of a virtual image, to be provided to an occupant within the vehicle interior (such as an automobile).

The vehicle display device 1 includes a display device 10 that emits display information, which allows an occupant within the vehicle interior to visually perceive as a virtual image, in the form of display light in a housing 61 described below (FIG. 1). The display device 10 includes a backlight unit 20 and a light-transmitting plate-shaped display unit 30, and causes the irradiation light being applied from the backlight unit 20 to the display unit 30 to be transmitted and then emitted from the display unit 30 as the display light for the display information (FIG. 1).

Furthermore, the vehicle display device 1 includes at least one reflective member that reflects the display light emitted from the display device 10 within the housing 61 and causes the display light to be projected onto a projection target portion Rwf within the vehicle interior through an opening 61*a* of the housing 61. In the present embodiment, one reflective member 40 is provided (FIG. 1). The reflective member 40 is, for example, an enlarging mirror that magnifies and reflects the display light emitted from the display device 10. For the reflective member 40, for example, an aspheric (free-form) mirror is used. The display light projected onto the projection target portion Rwf is reflected from the projection target portion Rwf toward an eye point EP or eye box EB, allowing an occupant to visually perceive the display light as a virtual image (FIG. 1). The eye point EP indicates the position of the eyes of an occupant within the vehicle interior. The eye box EB indicates the range of the eye point EP at which the virtual image is visually perceivable.

The vehicle display device 1 includes a control unit 50 that controls the display light depending on the eye point EP or eye box EB of an occupant (FIG. 1).

The vehicle display device 1 further includes the housing 61 that internally accommodates at least the display device 10 and the reflective member 40 and a transparent cover 62 that closes the opening 61*a* of this housing 61 (FIG. 1). In the vehicle display device 1, the display light reflected by the reflective member 40 is emitted through the cover 62 to the outside of the housing 61 and projected onto the projection target portion Rwf that exists beyond. The vehicle display device 1 illustrated herein is housed within an instrument panel Pi within the vehicle interior with the cover 62 exposed, and projects the display light reflected by the reflective member 40 onto the projection target portion Rwf (FIG. 1). Then, the vehicle display device 1 reflects the display light from the projection target portion Rwf toward the eye point EP or eye box EB.

In this context, the projection target portion Rwf refers to the windshield itself (in this case, a front windshield Wf) or a part of it. Additionally, the projection target portion Rwf may be formed as a half mirror that receives display light from the reflective member 40 at a reflective surface, reflects it toward the eye point EP or the eye box EB, and emits light from outside the vehicle to the occupant. For example, the projection target portion Rwf as a half mirror is formed as a semi-transparent film that conforms to the curved shape of the windshield (the front windshield Wf) and is adhered to the interior surface of the windshield within the vehicle interior using an adhesive. Alternatively, the projection target portion Rwf as a half mirror may also be formed as a semi-transparent film that conforms to the curved shape of the windshield (the front windshield Wf) and is sealed together with an intermediate film inside the laminated glass of the windshield. Furthermore, the projection target portion Rwf as a half mirror may also be a semi-transparent coating applied by painting or the like to the interior surface of the windshield (the front windshield Wf) within the vehicle interior. Moreover, the projection target portion Rwf may also be a combiner that covers the interior side of the front windshield Wf from the interior of a vehicle.

Figure 2:
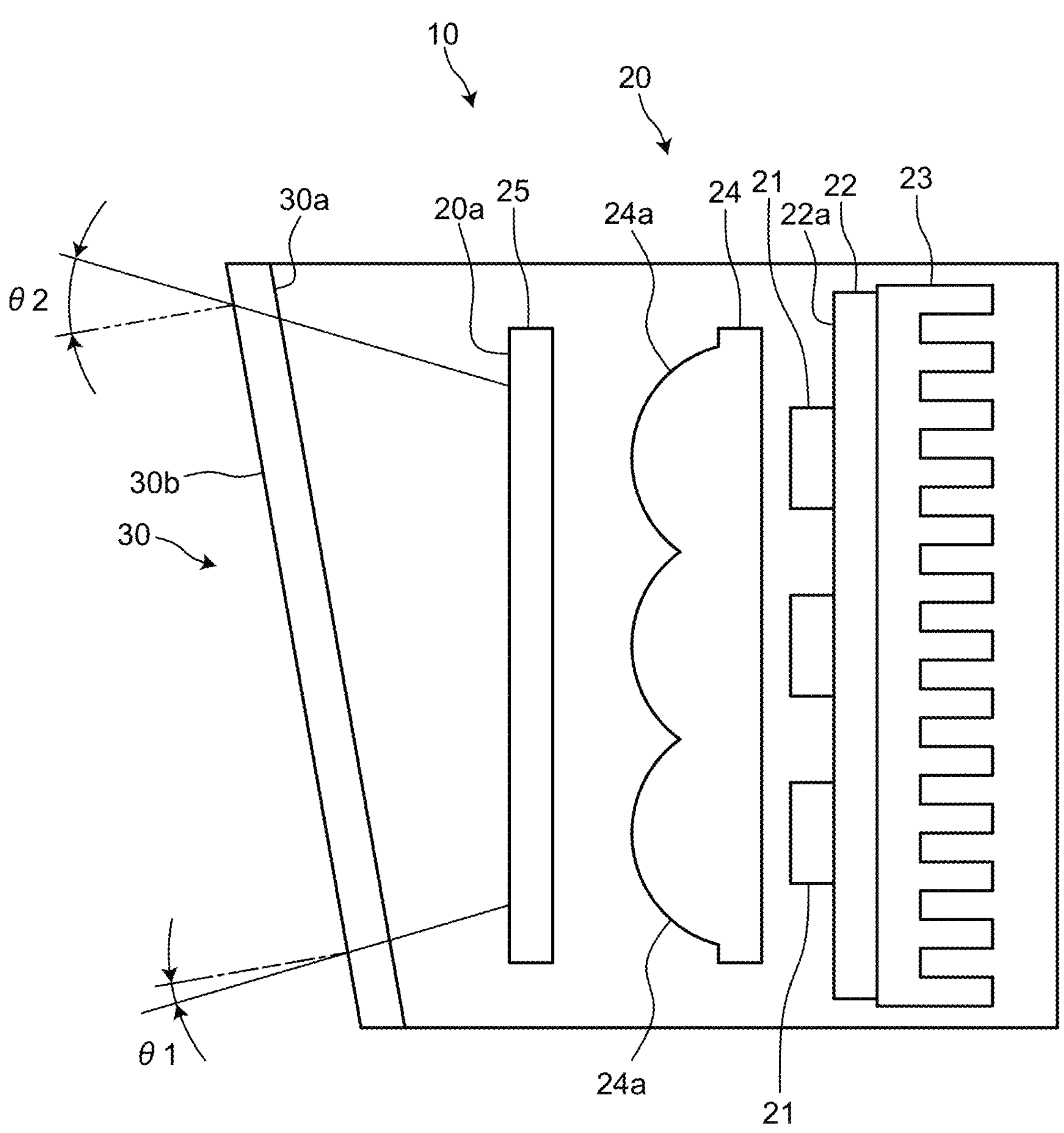
FIG. 2 is a schematic diagram illustrating a display device of the embodiment.
Figure 3:
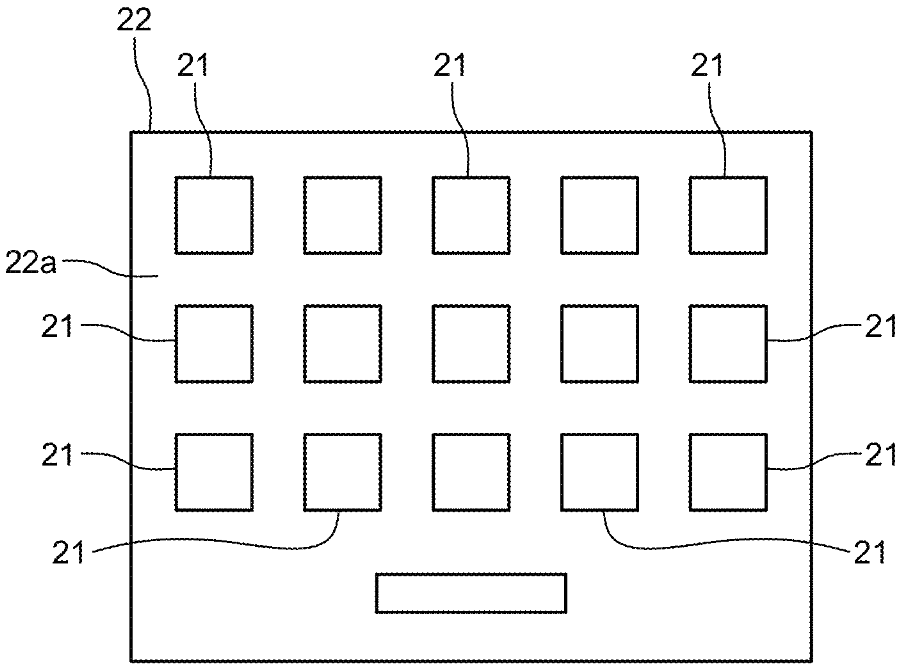
FIG. 3 is a diagram illustrated to describe an exemplary arrangement of a light source.

The backlight unit 20 includes a light source 21, a control board 22 for the light source 21, and a heat sink 23 that dissipates heat generated by the light source 21 (FIG. 2). The light source 21 is a light-emitting element. Herein, for the light-emitting element, a light-emitting diode element is used. The light source 21 is arranged in multiple positions between a first light source position associated with the irradiation light applied from a first edge (upper edge in the vertical direction) of an irradiation surface 20*a* described later and a second light source position associated with the irradiation light applied from a second edge (lower edge in the vertical direction) of the irradiation surface 20*a*. The backlight unit 20 illustrated herein is equipped with the multiple light sources 21 arranged in the vertical direction. The control board 22 electrically connects the light source 21 to a power supply via a wiring pattern. On a board surface 22*a* of the control board 22 illustrated herein, the multiple light sources 21 are arranged at equal intervals in both the vertical direction and the direction perpendicular to the vertical direction (FIGS. 2 and 3).

Furthermore, the backlight unit 20 includes a condenser lens 24 that is arranged to face the board surface 22*a* of the control board 22 and condenses light, which is emitted from the light source 21 interposed between the board surface 22*a* and the condenser lens 24 (hereinafter referred to as "source light"), and a field lens 25 that diffuses and distributes the source light condensed by the condenser lens 24 (FIG. 2).

The condenser lens 24 is a lens member made of glass or transparent resin that condenses the source light from the light source 21. For the condenser lens 24 illustrated herein, for example, a condenser lens is used in which a lens element 24*a* for each light source 21 is arranged to face the light source 21. The lens element 24*a* has an incident surface that receives the light from the light source 21 and an emission surface that emits the light from the incident surface, and is formed as a plano-convex lens with the incident surface shaped as a flat plane and the emission surface shaped as a convex curved plane.

The field lens 25 is a lens member made of glass or transparent resin that aligns the direction of travel of the source light emitted from the condenser lens 24, and is interposed between the condenser lens 24 and the display unit 30. The field lens 25 has an incident surface that receives the source light from the light source 21 via the condenser lens 24 and an emission surface that emits the source light incident from the incident surface. For the field lens 25 illustrated herein, for example, a Fresnel lens is used.

In the backlight unit 20, the emission surface of the field lens 25 serves as the irradiation surface 20*a* (FIG. 2), and the direction of travel of the source light of each light source 21 through the condenser lens 24 is aligned by the field lens 25, and the source light is diffused and distributed from the irradiation surface 20*a*. In the backlight unit 20, for example, the direction perpendicular to the board surface 22*a* of the control board 22 or the direction perpendicular to the incident surface of the lens element 24*a* of the condenser lens 24 corresponds to the optical axis direction. The backlight unit 20 irradiates the display unit 30 with the source light emitted from the irradiation surface 20*a* as the irradiation light.

The display unit 30 causes the irradiation light from the irradiation surface 20*a* of the backlight unit 20 to be incident on an irradiation target surface 30*a* on the back side and causes the display light as the display information from an emission surface 30*b* on the front side to be emitted toward the reflective member 40 (FIG. 2). The display unit 30 allows the irradiation light incident from the irradiation surface 20*a* to the irradiation target surface 30*a* to be transmitted and emitted from the emission surface 30*b* as display light. The display unit 30 illustrated herein uses a light-transmitting thin film transistor (TFT) liquid crystal display. The display unit 30 is controlled by the control unit 50 to display the display information. For example, image information items such as letters, numbers, and figures are displayed as the display information.

The display unit 30 is tilted relative to the irradiation surface 20*a* such that, between the irradiation surface 20*a* and the reflective member 40 arranged in the optical axis direction of the backlight unit 20 with respect to the irradiation surface 20*a*, the distance between the first edges defining the lower edges of the virtual image in the vertical direction on the irradiation surface 20*a* and the irradiation target surface 30*a* is greater than the distance between the second edges defining the upper edges of the virtual image in the vertical direction on the irradiation surface 20*a* and the irradiation target surface 30*a*. In the present embodiment, the irradiation surface 20*a* and the irradiation target surface 30*a* are arranged so that their respective vertical upper sides are the first edges and their respective vertical lower sides are the second edges. Thus, the display unit 30 is tilted relative to the irradiation surface 20*a* such that, between the irradiation surface 20*a* and the reflective member 40, the distance between the upper edges in the vertically upward direction of the irradiation surface 20*a* and the irradiation target surface 30*a* is greater than the distance between the lower edges in the vertically downward direction of the irradiation surface 20*a* and the irradiation target surface 30*a* (FIG. 2). As illustrated herein, the display unit 30 and irradiation surfaces 20*a* of the backlight unit 20 are each tilted such that their upper edges in the vertically upward direction incline toward the front of the vehicle, with their lower edges in the vertically downward direction acting as the pivot of rotational movement. In the vehicle display device 1, the tilt angle of the display unit 30 is made larger than the tilt angle of the irradiation surface 20*a* of the backlight unit 20, so that the optical axis of the backlight unit 20 intersects the irradiation target surface 30*a* and the emission surface 30*b* of the display unit 30 without being perpendicular to them.

Specifically, to avoid glare from the external light, in the case where external light entering through the opening 61*a* of the housing 61 is reflected by the reflective member 40 and reaches the emission surface 30*b*, the display unit 30 illustrated herein is tilted relative to the irradiation surface 20*a* of the backlight unit 20 to prevent the external light reflected by the emission surface 30*b* from being directed back toward the reflective member 40. For example, in this case, the external light reflected by the emission surface 30*b* is directed toward a bottom wall of the housing 61 (FIG. 1).

In this way, in the vehicle display device 1, the optical axis direction of the backlight unit 20 intersects the direction perpendicular to the irradiation target surface 30*a* and the emission surface 30*b* of the display unit 30. Thus, in the display unit 30, the absolute value of an emission angle θ (FIG. 2) of the display light relative to a reference emission direction (in this case, the orthogonal direction to the emission surface 30*b*) of the display light emitted from the emission surface 30*b* is larger at the upper edge than at the lower edge (θ2>θ1). For example, in the display unit 30 illustrated herein, the display light is emitted from the lower edge of the emission surface 30*b* at a negative emission angle θ relative to the reference emission direction, and the absolute value of the negative emission angle θ of the display light relative to the reference emission direction temporarily decreases as it moves from this lower edge toward the upper edge, and at a certain position, the display light is emitted in the reference emission direction (θ=0). Then, in the display unit 30 illustrated herein, a positive emission angle θ of the display light relative to the reference emission direction increases as it moves from the positive and negative switching position (θ=0) toward the upper edge, and at a certain position, the absolute value of this positive emission angle θ becomes equal to the absolute value of the negative emission angle θ at the lower edge, and the positive emission angle θ of the display light relative to the reference emission direction becomes even larger as it moves toward the upper edge from this position.

Figure 4:
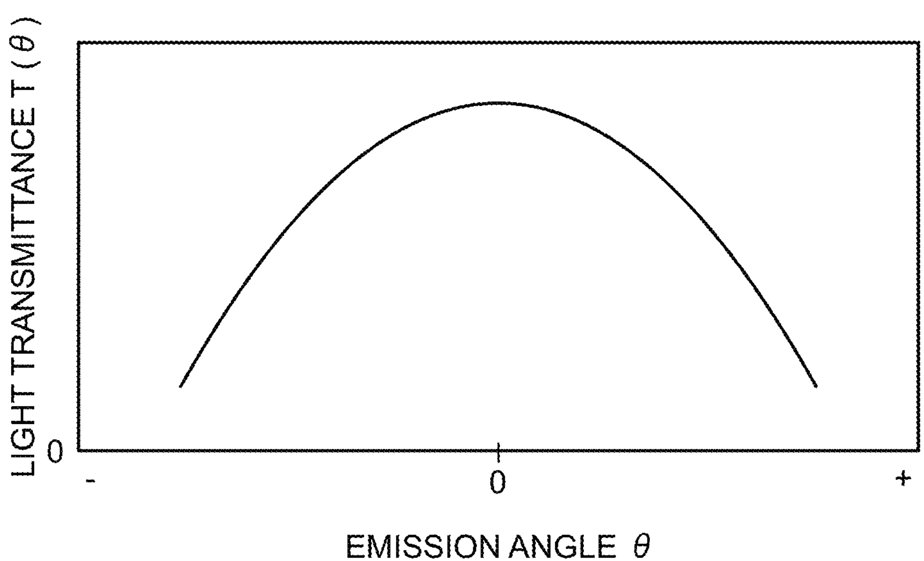
FIG. 4 is a diagram illustrated to describe the relationship between the emission angle and light transmittance in a display unit.
Figure 5:
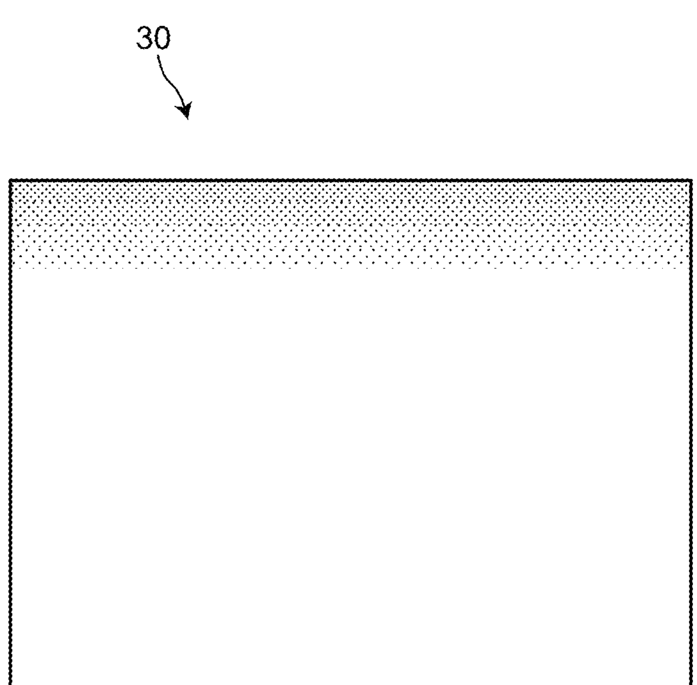
FIG. 5 is a diagram illustrated to describe unevenness in luminance in the display unit.
Figure 6:
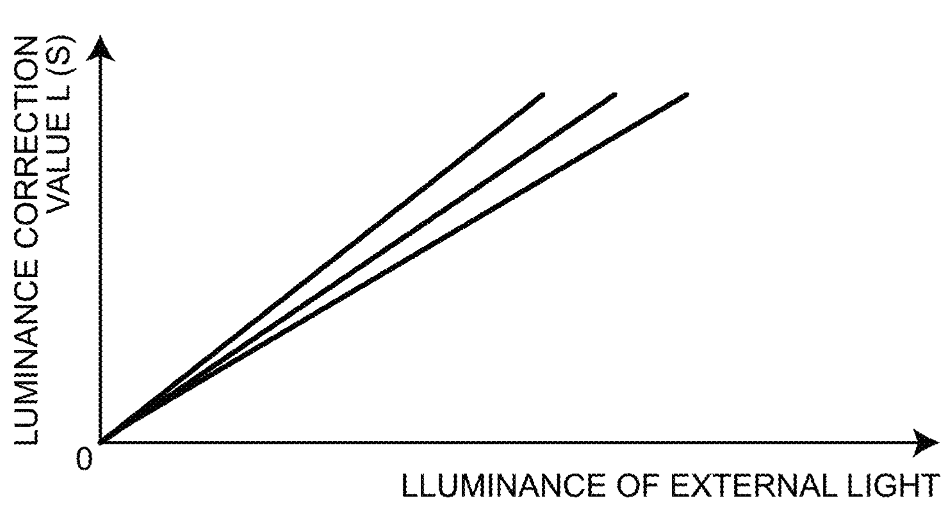
FIG. 6 is a diagram illustrated to describe an example of map data of a luminance correction value relative to the illuminance of external light.

In this case, the display unit 30 has the highest light transmittance T(θ) in the case where the emission angle θ of the display light relative to the reference emission direction is zero degrees, and the light transmittance T(θ) decreases as the emission angle θ of the display light relative to the reference emission direction increases, regardless of whether it is positive or negative (FIG. 4). In other words, the display unit 30 has the highest luminance L(θ) in the case where the emission angle θ of the display light relative to the reference emission direction is zero degrees, and the luminance L(θ) decreases as the emission angle θ of the display light relative to the reference emission direction increases, regardless of whether it is positive or negative. For this reason, in this display unit 30, if the illuminance of the light emitted from the irradiation surface 20*a* of the backlight unit 20 that is incident on the irradiation target surface 30*a* is uniform across the entire surface of the irradiation target surface 30*a*, the luminance L(θ) will be lower at the upper edge where the distance between the irradiation target surface 30*a* and the irradiation surface 20*a* is greater than at the lower edge than at the lower edge, resulting in unevenness in luminance (FIG. 5). For example, in this display unit 30, in the case where a first region in which the absolute value of the emission angle θ of the display light relative to the reference emission direction is kept below a certain value and a second region in which the absolute value of the emission angle θ exceeds a certain value and becomes even larger are mixed on the emission surface 30*b*, unevenness in luminance occurs between the first and second regions to the extent that it causes a sense of discomfort in the virtual image display. In this case, the region from the lower edge to just before the upper edge of the emission surface 30*b* constitutes the first region, and the luminance L(θ) at the upper edge of the emission surface 30*b*, which constitutes the second region, is significantly lower than that at the first region.

Thus, the control unit 50 controls the backlight unit 20 to reduce the unevenness in luminance in the display unit 30. The control unit 50 controls the backlight unit 20, and makes the illuminance of the light emitted from the irradiation surface 20*a* of the backlight unit 20 incident on the irradiation target surface 30*a* of the display unit 30 higher at the first edge than at the second edge (i.e., higher at the upper edge in the vertical direction than at the lower edge in the vertical direction), thereby reducing the unevenness in luminance of the display light emitted from the emission surface 30*b* of the display unit 30. In other words, the control unit

50 makes the illuminance of the light emitted from the irradiation surface 20*a* of the backlight unit 20 applied on the irradiation target surface 30*a* of the display unit 30 higher at the first edge than at the second edge of the irradiation target surface 30*a* (i.e., higher at the upper edge in the vertical direction than at the lower edge in the vertical direction), and makes the luminance L(θ) higher at the first edge than at the second edge of the emission surface 30*b* of the display unit 30 (i.e., higher at the upper edge in the vertical direction than the lower edge in the vertical direction), thereby reducing the unevenness in luminance of the display light emitted from the emission surface 30*b* across the entire emission surface 30*b*.

Specifically, the control unit 50 increases the luminance of the light source 21 arranged closer to the first light source position (i.e., the upper edge in the vertical direction) in the arrangement direction of the light source 21 in the backlight unit 20 compared to the luminance of the light source 21 arranged at the second light source position side (i.e., vertically below), making the illuminance of the light emitted from the irradiation surface 20*a* of the backlight unit 20 incident on the irradiation target surface 30*a* of the display unit 30 higher at the first edge than at the second edge (i.e., higher at the upper edge in the vertical direction than at the lower edge in the vertical direction). For example, the control unit 50 calculates the luminance L(θ) of the control target location (in this case, the upper edge of the emission surface 30*b*) using the following formula 1 based on the luminance L(θmin) and light transmittance T(θmin) at the location where the absolute value of the emission angle θ of the display light relative to the reference emission direction is minimum. Then, the control unit 50 controls the luminance of the light source 21 corresponding to a control target location (in this case, the upper edge of the emission surface 30*b*) based on the calculated value of the luminance L(θ) to approximate the luminance L(θ).

$$L(\theta)=\{T(\theta\text{min})/T(\theta)\}*L(\theta\text{min}) \quad (1)$$

In this way, the vehicle display device 1 of the present embodiment makes the luminance L(θ) at the first edge of the emission surface 30*b* of the display unit 30 higher than at the second edge (i.e., higher at the upper edge in the vertical direction than at the lower edge in the vertical direction), thereby reducing the unevenness in luminance of the display light emitted from the emission surface 30*b* across the entire emission surface 30*b* and improving the visibility of the virtual image display.

By the way, strictly speaking, in the display unit 30, the absolute value of the emission angle θ of the display light relative to the reference emission direction differs at each position on the emission surface 30*b*, so that there is a deviation in the luminance L(θ) at each position. For this reason, in the display unit 30, even in places where the effect on the visibility of the virtual image display is small, from a strict point of view, unevenness in luminance occurs.

Thus, the emission surface 30*b* of the display unit 30 is initially divided into a plurality of partitioned regions. For example, the emission surface 30*b* is divided into partitioned regions for each light source 21, that is, into a plurality of partitioned regions arranged at equal intervals in the vertical direction and in the direction perpendicular to the vertical direction. Then, the control unit 50 calculates the luminance L(θ) of each partitioned region, excluding the partitioned region in which the absolute value of the emission angle θ of the display light relative to the reference emission direction is the minimum, based on the above formula 1. Subsequently, the control unit 50 controls the luminance of the light source 21 corresponding to the control target partitioned region based on the calculated value of the luminance L(θ) for each partitioned region to approximate the luminance L(θ). This makes it possible for the vehicle display device 1 to further reduce the unevenness in luminance of the display light emitted from the emission surface 30*b* of the display unit 30 across the entire emission surface 30*b*, thereby further improving the visibility of the virtual image display.

In addition, the control unit 50 may also adjust the illuminance of the irradiation light applied from the irradiation surface 20*a* of the backlight unit 20 that is incident on the irradiation target surface 30*a* of the display unit 30 for each partitioned region depending on the illuminance of the external light for each partitioned region, thereby reducing the unevenness in luminance of the display light emitted from the emission surface 30*b* of the display unit 30. In this case, the vehicle display device 1 is provided with an illuminometer for each partitioned region to measure the illuminance of the external light reflected from the reflective member 40. Alternatively, the vehicle display device 1 measures the illuminance of the external light entering through the opening 61*a* of the housing 61 with an illuminometer, and causes the control unit 50 to estimate the illuminance of the external light for each partitioned region based on the measurement result obtained by the measurement. For example, the control unit 50 is provided with map data of a luminance correction value L(S) corresponding to the illuminance of the external light (FIG. 6) and calculates the luminance correction value L(S) corresponding to the illuminance of the external light for each partitioned region from the map data. For example, the luminance correction value L(S) is used as a correction coefficient, and the luminance L(θ) of the control target partitioned region is calculated from the following formula 2.

$$L(\theta)=\{T(\theta\text{min})/T(\theta)\}*L(\theta\text{min})*L(S) \quad (2)$$

The control unit 50 controls the luminance of the light source 21 corresponding to the control target partitioned region based on the calculated value of the luminance L(θ) so that the luminance of the light source 21 approximates the luminance L(θ). This makes it possible for the vehicle display device 1 to eliminate the effects of external light and further reduce the unevenness in luminance of the display light emitted from the emission surface 30*b* of the display unit 30 across the entire emission surface 30*b*, thereby further improving the visibility of the virtual image display.

Modifications

Figure 7:
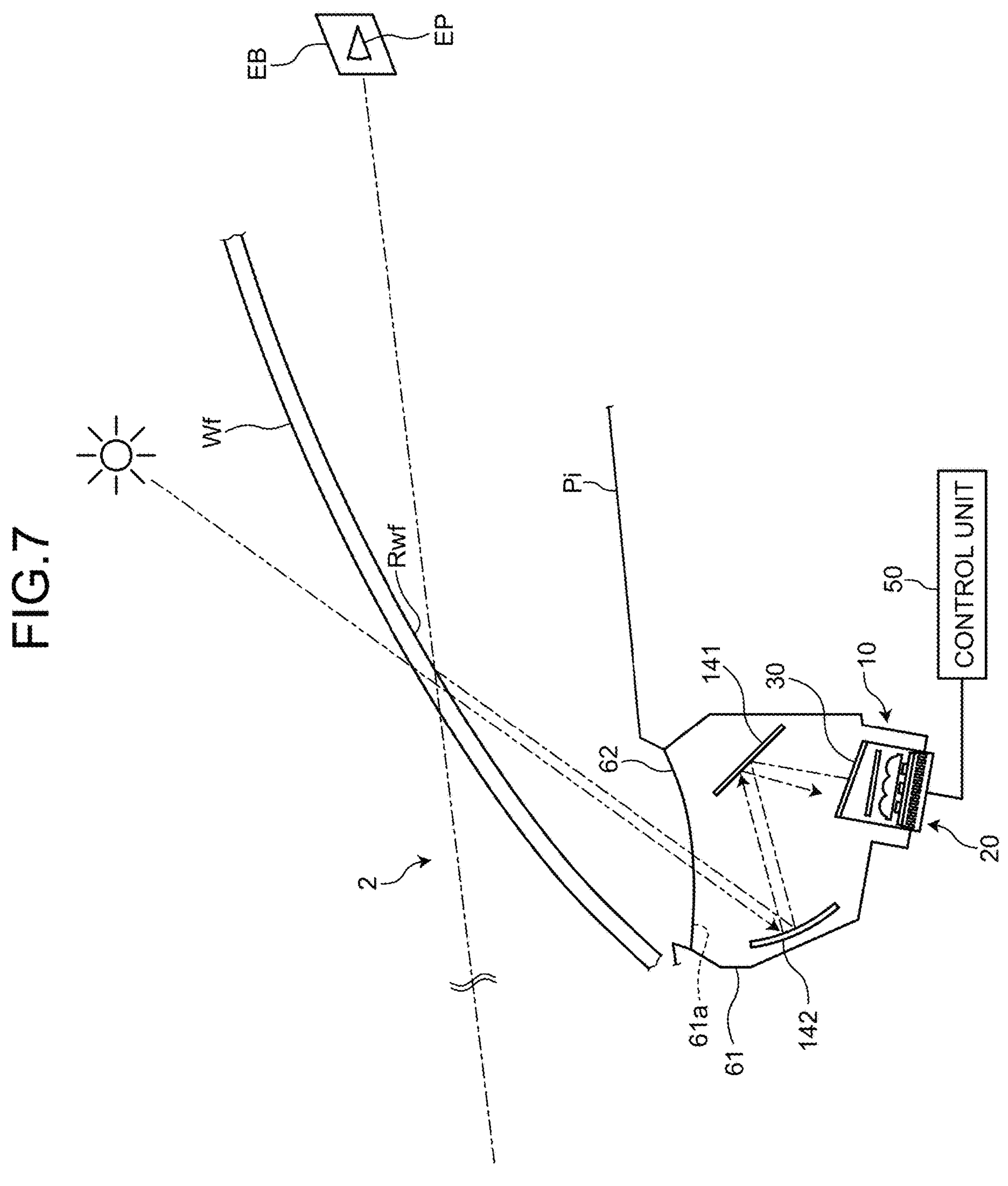
FIG. 7 is a schematic diagram illustrating a vehicle display device of a modification.

A vehicle display device 2 of the present modification is different from the vehicle display device 1 of the embodiment mentioned above in that the mounting angle of the display device 10 is altered, and another reflective member is added (FIG. 7).

The vehicle display device 2 includes, as reflective members, a first reflective member 141 that reflects the display light emitted from the display device 10 and a second reflective member 142, which reflects the display light reflected by the first reflective member 141 and causes the reflected light to be projected onto the projection target portion Rwf through the opening 61*a* of the housing 61 (FIG. 7). The first reflective member 141 is a folding mirror. Moreover, the second reflective member 142 is an enlarging mirror, similar to the reflective member 40 of the embodiment previously described.

The display unit 30 of the display device 10 of the present modification is tilted relative to the irradiation surface 20*a* such that, between the irradiation surface 20*a* and the reflective member 40, the distance between the first edges defining the lower edges of the virtual image in the vertical direction on the irradiation surface 20*a* and the irradiation target surface 30*a* is greater than the distance between the second edges defining the upper edges of the virtual image in the vertical direction on the irradiation surface 20*a* and the irradiation target surface 30*a*, which is similar to the display device 10 of the embodiment. However, the display device 10 of the embodiment is arranged so that the display light is emitted from the emission surface 30*b* of the display unit 30 toward the front of the vehicle. On the other hand, the display device 10 of the present modification is arranged so that the display light is emitted from the emission surface 30*b* of the display unit 30 toward either the vertical upper side (i.e., toward the upper side of the vehicle) or the vertical lower side (i.e., toward the lower side of the vehicle). Thus, the display device 10 of the present modification employs the following configuration.

The irradiation surface 20*a* and the irradiation target surface 30*a* of the present modification are arranged so that one edge side in a direction perpendicular to the vertical direction corresponds to a first edge and the other edge side in a direction perpendicular to the vertical direction corresponds to a second edge. Then, the light source 21 of the present modification is arranged in multiple positions between a first light source position associated with the irradiation light from the first edge of the irradiation surface 20*a* of the present modification and a second light source position associated with the irradiation light from the second edge of the irradiation surface 20*a*. The display unit 30 is tilted relative to the irradiation surface 20*a* such that, between the irradiation surface 20*a* and the first reflective member 141, the distance between the other edge on the irradiation surface 20*a* and the other edge on the irradiation target surface 30*a* is greater than the distance between the one edge on the irradiation surface 20*a* and the one edge on the irradiation target surface 30*a*.

Figure 8:
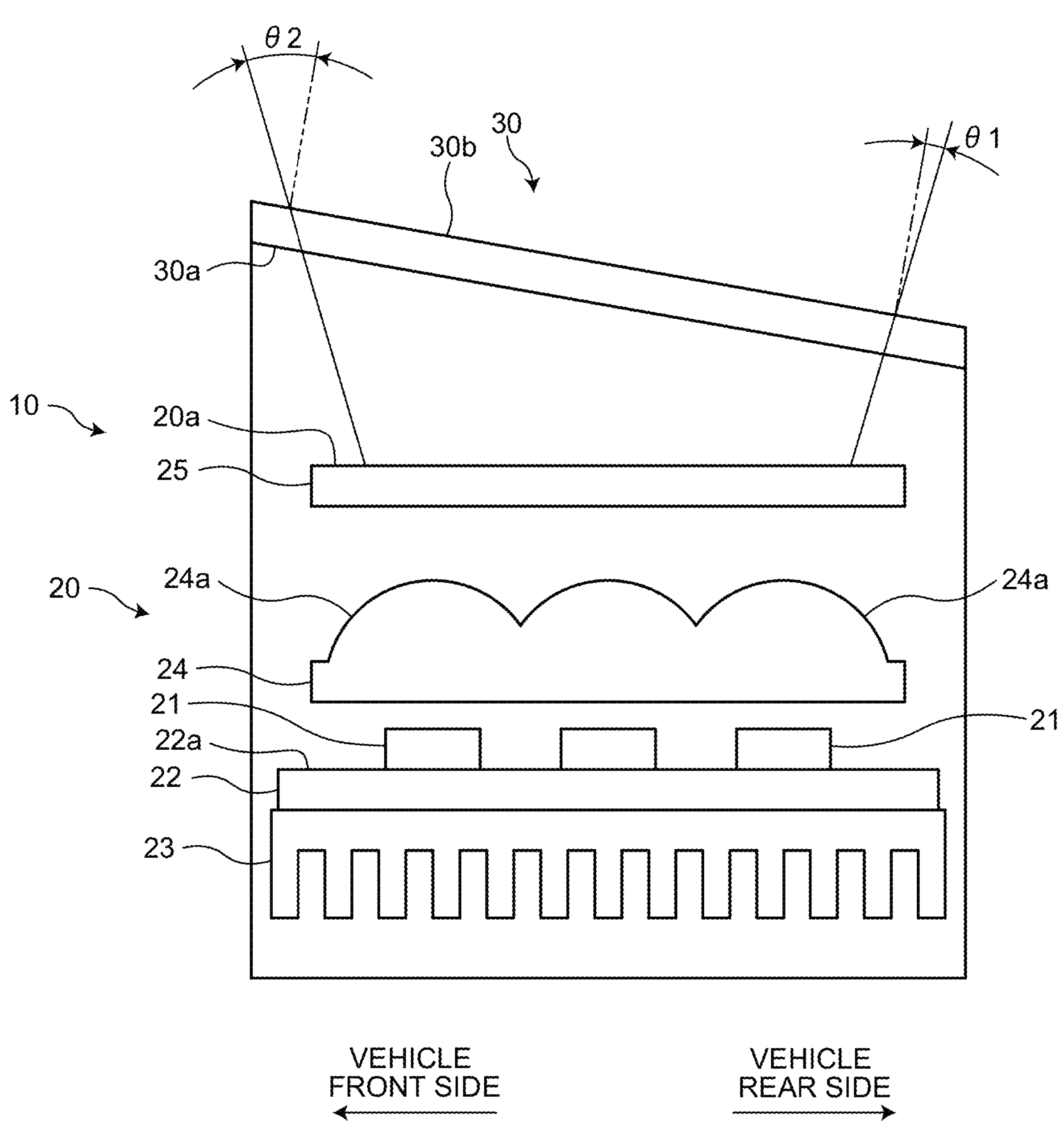
FIG. 8 is a schematic diagram illustrating a display device of the modification.

In this example, the display light is emitted from the emission surface 30*b* of the display unit 30 vertically upward (i.e., toward the upper side of the vehicle) to create a virtual image in front of the vehicle (FIG. 7). Thus, the irradiation surface 20*a* and the irradiation target surface 30*a* illustrated herein are each arranged so that the first edge is located on the front side of the vehicle and the second edge is located on the rear side of the vehicle (FIG. 8). Then, the backlight unit 20 illustrated herein includes a plurality of light sources 21 arranged in the front-rear direction of the vehicle (FIG. 8). The display unit 30 illustrated herein is tilted relative to the irradiation surface 20*a* such that, between the irradiation surface 20*a* and the first reflective member 141, the distance between the edges of the irradiation surface 20*a* and the irradiation target surface 30*a* on the vehicle front side is greater than the distance between the edges of the irradiation surface 20*a* and the irradiation target surface 30*a* on the vehicle rear side (FIG. 7).

The control unit 50 of the present modification controls the backlight unit 20, and makes the illuminance of the irradiation light from the irradiation surface 20*a* of the backlight unit 20, which is incident on the irradiation target surface 30*a* of the display unit 30, higher at one edge than at the other edge (i.e., higher at the edge on the vehicle front side than at the edge on the vehicle rear side), thereby reducing the unevenness in luminance of the display light emitted from the emission surface 30*b* of the display unit 30. In other words, the control unit 50 makes the illuminance of the irradiation light from the irradiation surface 20*a* of the backlight unit 20, which is incident on the irradiation target surface 30*a* of the display unit 30, higher at one edge than at the other edge of the irradiation target surface 30*a* (i.e., higher at the edge on the vehicle front side than at the edge on the vehicle rear side), and makes the luminance L(θ) higher at one edge than at the other edge of the emission surface 30*b* of the display unit 30 (i.e., higher at the edge on the vehicle front side than the edge on the vehicle rear side), thereby reducing the unevenness in luminance of the display light emitted from the emission surface 30*b* across the entire emission surface 30*b*.

Specifically, the control unit 50 of the present modification increases the luminance of the light source 21 positioned closer to the first light source position (i.e., on the vehicle front side) in the arrangement direction of the light sources 21 in the backlight unit 20 compared to the luminance of the light source 21 arranged on the second light source position (i.e., edge on the vehicle rear side), making the illuminance of the irradiation light from the irradiation surface 20*a* of the backlight unit 20 that is incident on the irradiation target surface 30*a* of the display unit 30 higher at one edge than at the other edge (i.e., higher at the edge on the vehicle front side than at the edge on the vehicle rear side).

The vehicle display device 2 of the present modification is capable of achieving similar effects to that of the vehicle display device 1 of the embodiment, even with the first reflective member (folding mirror) 141 interposed between the display device 10 and the second reflective member (enlarging mirror) 142 in the manner previously described.

The vehicle display device according to the present embodiment makes the luminance of the emission surface of the display unit higher at the first edge than at the second edge to reduce unevenness in luminance of the display light emitted from the emission surface across the entire emission surface, thereby improving the visibility of the virtual image display.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:

a housing;

a display device including a backlight and a light-transmitting plate-shaped display unit, configured to emit display information as display light, visually perceived by an occupant within a vehicle interior as a virtual image, within the housing;

at least one reflector configured to reflect the display light emitted from the display device within the housing and cause the display light to be projected onto a projection target portion within the vehicle interior through an opening of the housing; and a control unit configured to control the display light depending on an eye point of the occupant or an eye box that is a range of the eye points that enables the visual perception of the virtual image;

wherein the backlight is configured to diffuse and distribute light of a light source from an irradiation surface and the light-transmitting plate-shaped display unit is configured to cause irradiation light incident from the irradiation surface to an irradiation target surface to be transmitted and emitted from an emission surface as the display light, the light-transmitting plate-shaped display unit is tilted relative to the irradiation surface such that, between the irradiation surface and the reflector arranged in an optical axis direction of the backlight with respect to the irradiation surface, a distance between first edges defining lower edges of the virtual image in a vertical direction on the irradiation surface and the irradiation target surface is greater than a distance between second edges defining upper edges of the virtual image in the vertical direction on the irradiation surface and the irradiation target surface, and the control unit controls the backlight to make illuminance of the irradiation light to be incident from the irradiation surface to the irradiation target surface higher at the first edge than at the second edge, reducing unevenness in luminance of the display light to be emitted from the emission surface of the light-transmitting plate-shaped display unit, the light-transmitting plate-shaped display unit is tilted relative to the irradiation surface such that, in a case where external light entering through the opening of the housing is reflected by the at least one reflector and reaches the emission surface, the external light reflected by the emission surface is prevented from being directed back toward the at least one reflector, and the control unit adjusts the illuminance of the irradiation light to be incident from the irradiation surface to the irradiation target surface for each of partitioned regions obtained by partitioning the emission surface of the light-transmitting plate-shaped display unit into a plurality of regions depending on illuminance of the external light for each of the partitioned regions, reducing unevenness in luminance of the display light to be emitted from the emission surface of the light-transmitting plate-shaped display unit.

2. The vehicle display device according to claim 1, wherein the light source is arranged at a plurality of positions between a first light source position associated with the irradiation light from the first edge of the irradiation surface and a second light source position associated with the irradiation light from the second edge of the irradiation surface, and the control unit increases luminance of the light source arranged closer to the first light source position in an arrangement direction of the light sources compared to luminance of the light source arranged at the second light source position, making the illuminance of the irradiation light to be incident from the irradiation surface to the irradiation target surface higher at the first edge than at the second edge.

3. The vehicle display device according to claim 1, wherein the at least one reflector is provided as one reflector between the display device and the housing, the irradiation surface and the irradiation target surface are each provided in an arrangement such that an upper side in the vertical direction corresponds to the first edge and a lower side in the vertical direction corresponds to the second edge, the light-transmitting plate-shaped display unit is tilted relative to the irradiation surface such that, between the irradiation surface and the one reflector, a distance between upper edges of the upper side in the vertical direction on the irradiation surface and the irradiation target surface is greater than a distance between lower edges of the lower side in the vertical direction on the irradiation surface and the irradiation target surface, and the control unit controls the backlight to make the illuminance of the irradiation light to be incident from the irradiation surface to the irradiation target surface higher at the upper edge than at the lower edge.

4. The vehicle display device according to claim 2, wherein the at least one reflector is provided as one reflector between the display device and the housing, the irradiation surface and the irradiation target surface are each provided in an arrangement such that an upper side in the vertical direction corresponds to the first edge and a lower side in the vertical direction corresponds to the second edge, the light-transmitting plate-shaped display unit is tilted relative to the irradiation surface such that, between the irradiation surface and the one reflector, a distance between upper edges of the upper side in the vertical direction on the irradiation surface and the irradiation target surface is greater than a distance between lower edges of the lower side in the vertical direction on the irradiation surface and the irradiation target surface, and the control unit controls the backlight to make the illuminance of the irradiation light to be incident from the irradiation surface to the irradiation target surface higher at the upper edge than at the lower edge.

5. A vehicle display device comprising:

a housing;

a display device including a backlight and a light-transmitting plate-shaped display unit, configured to emit display information as display light, visually perceived by an occupant within a vehicle interior as a virtual image, within the housing;

at least one reflector configured to reflect the display light emitted from the display device within the housing and cause the display light to be projected onto a projection target portion within the vehicle interior through an opening of the housing; and a control unit configured to control the display light depending on an eye point of the occupant or an eye box that is a range of the eye points that enables the visual perception of the virtual image;

wherein the backlight is configured to diffuse and distribute light of a light source from an irradiation surface and the light-transmitting plate-shaped display unit is configured to cause irradiation light incident from the irradiation surface to an irradiation target surface to be transmitted and emitted from an emission surface as the display light, the light-transmitting plate-shaped display unit is tilted relative to the irradiation surface such that, between the irradiation surface and the reflector arranged in an optical axis direction of the backlight with respect to the irradiation surface, a distance between first edges defining lower edges of the virtual image in a vertical direction on the irradiation surface and the irradiation target surface is greater than a distance between second edges defining upper edges of the virtual image in the vertical direction on the irradiation surface and the irradiation target surface, the control unit controls the backlight to make illuminance of the irradiation light to be incident from the irradiation surface to the irradiation target surface higher at the first edge than at the second edge, reducing unevenness in luminance of the display light to be emitted from the emission surface of the light-transmitting plate-shaped display unit, the at least one reflector includes a first reflector configured to reflect the display light emitted from the display device and a second reflector configured to reflect the display light reflected by the first reflector and cause the display light to be projected onto the projection target portion through the opening of the housing, the irradiation surface and the irradiation target surface are each provided in an arrangement such that one edge in a direction orthogonal to the vertical direction corresponds to the first edge and the other edge in the orthogonal direction corresponds to the second edge, the light-transmitting plate-shaped display unit is tilted relative to the irradiation surface such that, between the irradiation surface and the first reflector, a distance between the one edge on the irradiation surface and the one edge on the irradiation target surface is greater than a distance between the other edge on the irradiation surface and the other edge on the irradiation target surface, and the control unit controls the backlight to make the illuminance of the irradiation light to be incident from the irradiation surface to the irradiation target surface higher at the one edge than at the other edge.

6. A vehicle display device comprising:

a housing;

a display device including a backlight and a light-transmitting plate-shaped display unit, configured to emit display information as display light, visually perceived by an occupant within a vehicle interior as a virtual image, within the housing;

at least one reflector configured to reflect the display light emitted from the display device within the housing and cause the display light to be projected onto a projection target portion within the vehicle interior through an opening of the housing; and a control unit configured to control the display light depending on an eye point of the occupant or an eye box that is a range of the eye points that enables the visual perception of the virtual image;

wherein the backlight is configured to diffuse and distribute light of a light source from an irradiation surface and the light-transmitting plate-shaped display unit is configured to cause irradiation light incident from the irradiation surface to an irradiation target surface to be transmitted and emitted from an emission surface as the display light, the light-transmitting plate-shaped display unit is tilted relative to the irradiation surface such that, between the irradiation surface and the reflector arranged in an optical axis direction of the backlight with respect to the irradiation surface, a distance between first edges defining lower edges of the virtual image in a vertical direction on the irradiation surface and the irradiation target surface is greater than a distance between second edges defining upper edges of the virtual image in the vertical direction on the irradiation surface and the irradiation target surface, the control unit controls the backlight to make illuminance of the irradiation light to be incident from the irradiation surface to the irradiation target surface higher at the first edge than at the second edge, reducing unevenness in luminance of the display light to be emitted from the emission surface of the light-transmitting plate-shaped display unit, the light source is arranged at a plurality of positions between a first light source position associated with the irradiation light from the first edge of the irradiation surface and a second light source position associated with the irradiation light from the second edge of the irradiation surface, the control unit increases luminance of the light source arranged closer to the first light source position in an arrangement direction of the light sources compared to luminance of the light source arranged at the second light source position, making the illuminance of the irradiation light to be incident from the irradiation surface to the irradiation target surface higher at the first edge than at the second edge, the at least one reflector includes a first reflector configured to reflect the display light emitted from the display device and a second reflector configured to reflect the display light reflected by the first reflector and cause the display light to be projected onto the projection target portion through the opening of the housing, the irradiation surface and the irradiation target surface are each provided in an arrangement such that one edge in a direction orthogonal to the vertical direction corresponds to the first edge and the other edge in the orthogonal direction corresponds to the second edge, the light-transmitting plate-shaped display unit is tilted relative to the irradiation surface such that, between the irradiation surface and the first reflector, a distance between the one edge on the irradiation surface and the one edge on the irradiation target surface is greater than a distance between the other edge on the irradiation surface and the other edge on the irradiation target surface, and the control unit controls the backlight to make the illuminance of the irradiation light to be incident from the irradiation surface to the irradiation target surface higher at the one edge than at the other edge.

* * * * *